US011170505B2

(12) United States Patent
Minami et al.

(10) Patent No.: US 11,170,505 B2
(45) Date of Patent: Nov. 9, 2021

(54) IMAGE PROCESSING APPARATUS, IMAGE PROCESSING METHOD, IMAGE PROCESSING SYSTEM, AND STORAGE MEDIUM

(71) Applicant: CANON KABUSHIKI KAISHA, Tokyo (JP)

(72) Inventors: Yoshitaka Minami, Kashiwa (JP); Ryo Ishikawa, Kawasaki (JP); Toru Tanaka, Chofu (JP); Kiyohide Satoh, Kawasaki (JP); Keita Nakagomi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 146 days.

(21) Appl. No.: 16/225,765

(22) Filed: Dec. 19, 2018

(65) Prior Publication Data
US 2019/0197687 A1   Jun. 27, 2019

(30) Foreign Application Priority Data

Dec. 27, 2017  (JP) .............................. JP2017-251422

(51) Int. Cl.
*G06T 7/00* (2017.01)
*G06T 3/00* (2006.01)
(Continued)

(52) U.S. Cl.
CPC .......... *G06T 7/0014* (2013.01); *G06T 3/0068* (2013.01); *G06T 3/40* (2013.01);
(Continued)

(58) Field of Classification Search
CPC ............. G06T 5/50; G06T 2207/20224; G06T 2207/30004; G06T 2207/20076;
(Continued)

(56) References Cited

U.S. PATENT DOCUMENTS

2008/0095422 A1* 4/2008 Suri ..................... G06K 9/6206
                                                                 382/131
2008/0232667 A1* 9/2008 Kitamura ................. G06K 9/54
                                                                 382/132
(Continued)

FOREIGN PATENT DOCUMENTS

JP         H08-103439 A     4/1996
JP         2005-136594 A    5/2005

OTHER PUBLICATIONS

Ryo Sakamoto, MD.PhD, et al. Temporal Subtraction of Serial CT Images with Large Deformation Diffeomorphic Metric Mapping in the Identification of Bone Metastases, Radiology, vol. 285, No. 2—2017.

*Primary Examiner* — Margaret G Mastrodonato
(74) *Attorney, Agent, or Firm* — Canon U.S.A., Inc. IP Division

(57) ABSTRACT

An apparatus acquires a first converted image by converting resolution of a first image of a subject into first resolution, acquires a second converted image by converting resolution of a second image into the first resolution, acquires first deformation information for executing image registration between the first converted image and the second converted image with the first resolution, and generates a subtraction image with the first resolution based on the first deformation information, the subtraction image showing a difference between the first converted image and the second converted image, or generates a second subtraction image based on second deformation information obtained in such a manner that resolution of the first deformation information is converted into the resolution of the first image, the second subtraction image showing a difference between the first image and the second image.

14 Claims, 10 Drawing Sheets

(51) Int. Cl.
  *G06T 5/50* (2006.01)
  *G06T 3/40* (2006.01)
(52) U.S. Cl.
  CPC ...... *G06T 5/50* (2013.01); *G06T 2207/20224* (2013.01); *G06T 2207/30004* (2013.01); *G06T 2207/30008* (2013.01)
(58) Field of Classification Search
  CPC .................. G06T 7/0014; G06T 7/33; G06T 2207/20016; G06T 2207/30008; G06T 3/0068; G06T 3/40
  See application file for complete search history.

(56) References Cited

U.S. PATENT DOCUMENTS

| | | | | |
|---|---|---|---|---|
| 2012/0075506 A1* | 3/2012 | van Beek | ................ | G06T 5/002 348/241 |
| 2016/0093060 A1* | 3/2016 | Rivet-Sabourin | ....... | G06T 5/002 382/128 |
| 2016/0155221 A1* | 6/2016 | Fleischer | .................. | G06T 5/50 382/131 |

* cited by examiner

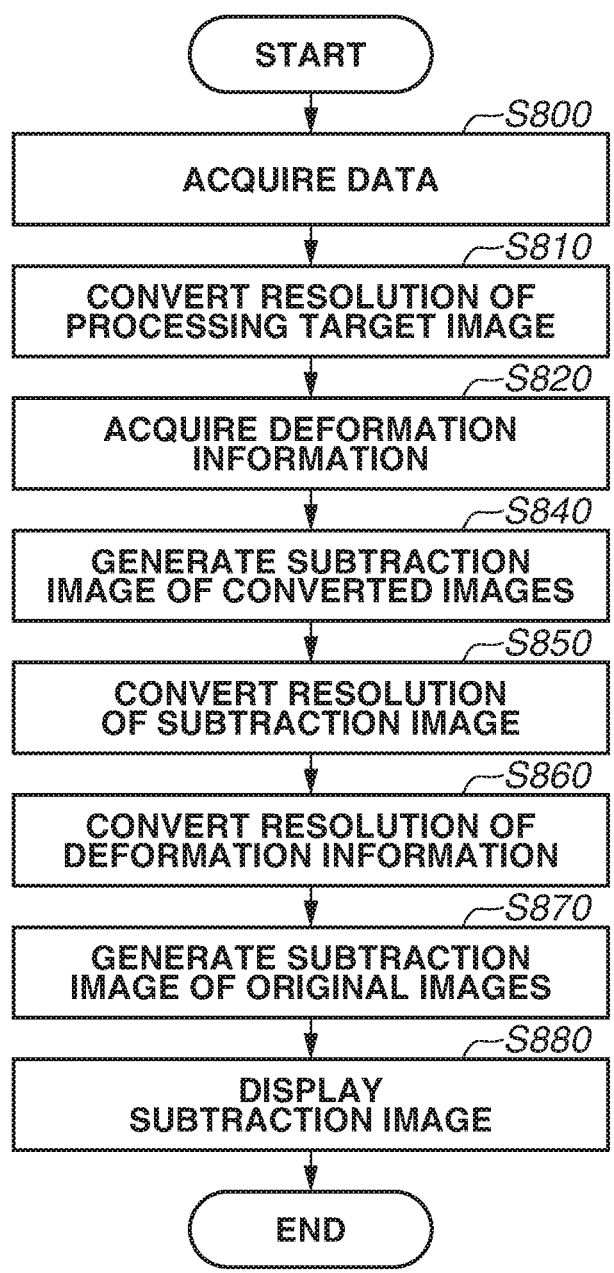

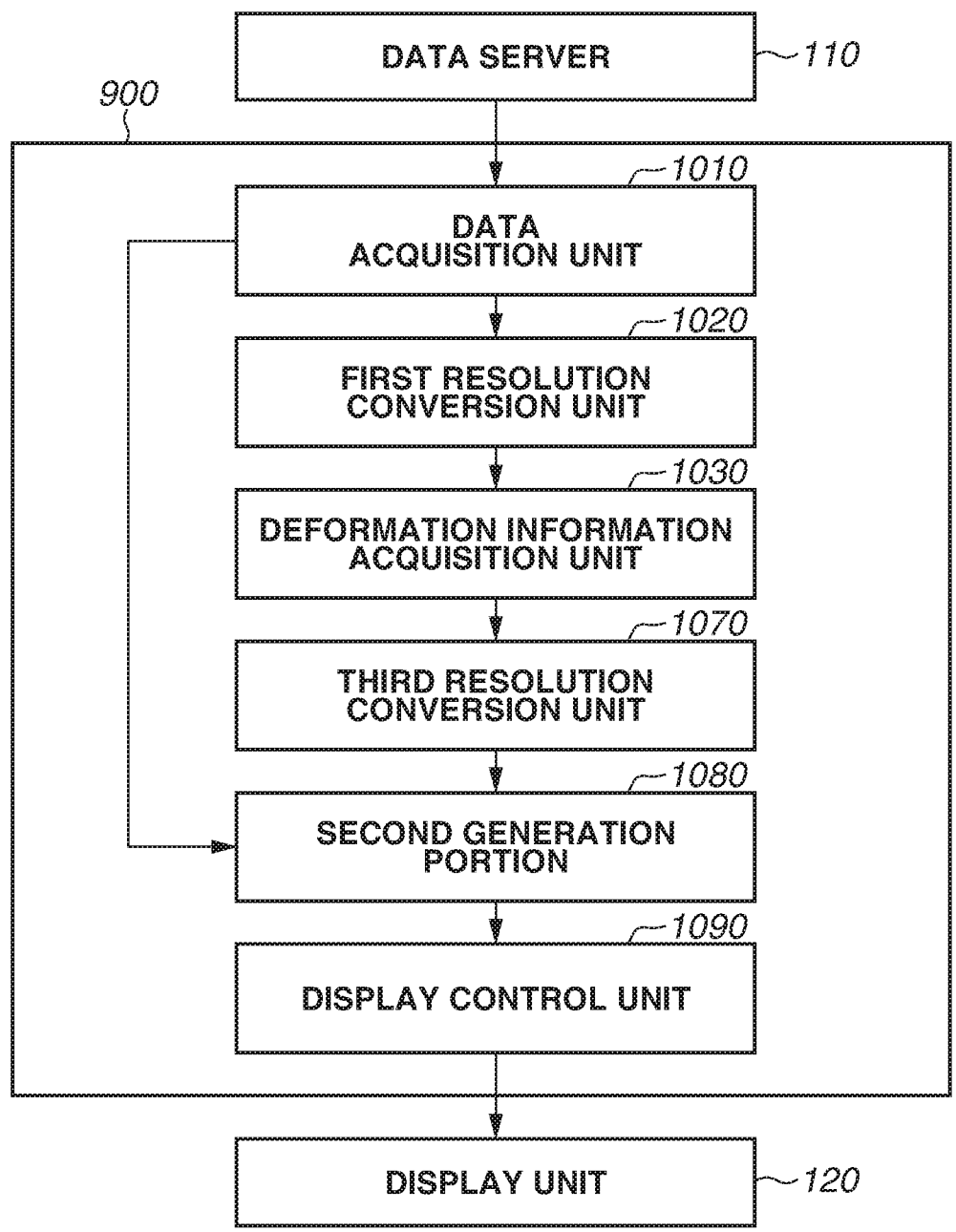

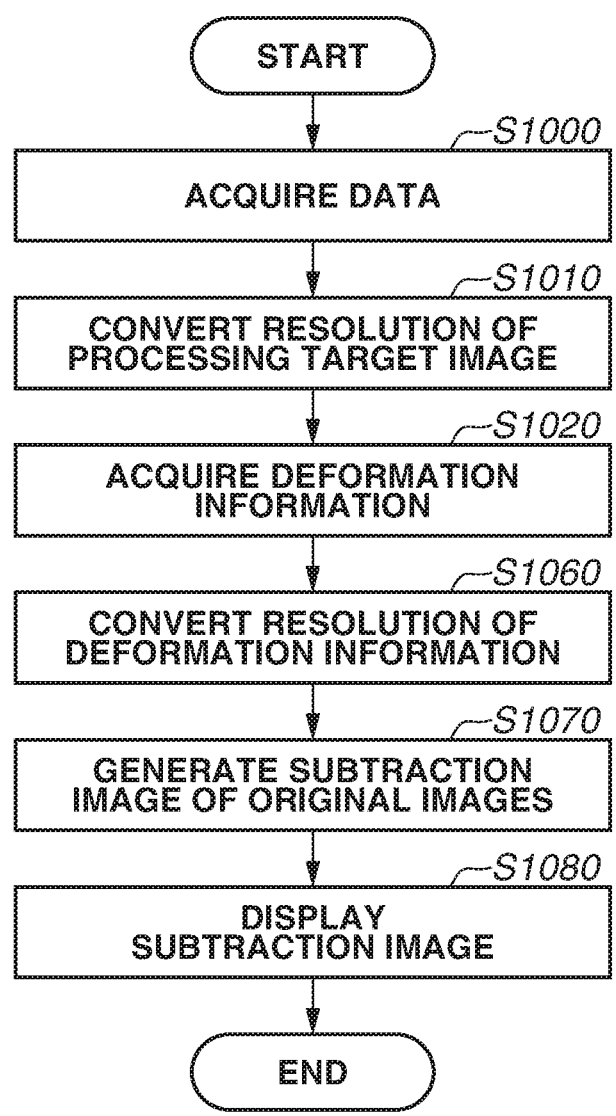

IMAGE PROCESSING APPARATUS, IMAGE PROCESSING METHOD, IMAGE PROCESSING SYSTEM, AND STORAGE MEDIUM

BACKGROUND

Field

The aspect of the embodiments relates to an image processing apparatus, an image processing method, an image processing system, and a storage medium.

Description of the Related Art

In the medical field, a doctor uses medical images captured by various modalities to make a diagnosis. Particularly, for the purpose of following up a state of a subject, a doctor observes temporal changes in the subject, which is called a follow-up, by comparing a plurality of images captured at different times by the same modality. Even in a field other than the medical field, a similar operation may be performed when chronological changes in an object is to be observed. Further, other than the case of a chronological comparison, the doctor sometimes compares the same subject's two images captured in different radiographic contrasting conditions or different imaging parameters to make diagnosis.

There has been known an image subtraction technique which helps a user to make a comparison between images. Using the technique, image registration between two images is executed, and a subtraction image in which differences between the two images are visualized is displayed. In this image subtraction technique, processing is sometimes executed in such a manner that resolutions of the two images are matched if the resolutions of the two images are different from each other. In a method described in SAKAMOTO, Ryo, et al. Temporal Subtraction of Serial CT Images with Large Deformation Diffeomorphic Metric Mapping in the Identification of Bone Metastases. Radiology, 2017, 161942, resolution of two images is converted into predetermined isotropic resolution, and image registration is executed between the two images. Then, a subtraction image is generated from the two images with that isotropic resolution. The resolution is then converted into resolution of the original images.

SUMMARY

According to an aspect of the embodiments, an apparatus includes a first resolution conversion unit configured to acquire a first converted image by converting resolution of a first image of a subject into first resolution and acquire a second converted image by converting resolution of a second image into the first resolution, an acquisition unit configured to acquire first deformation information with the first resolution, the first deformation information being for executing image registration between the first converted image and the second converted image, a first generation unit configured to generate a subtraction image with the first resolution based on the first deformation information, the subtraction image showing a difference between the first converted image and the second converted image; and a second generation unit configured to generate a second subtraction image based on second deformation information obtained such that resolution in the first deformation information is converted into the resolution of the first image, the second subtraction image showing a difference between the first image and the second image.

Further features of the disclosure will become apparent from the following description of exemplary embodiments (with reference to the attached drawings).

BRIEF DESCRIPTION OF THE DRAWINGS

FIG. 8 is a flowchart illustrating an example of processing according to the fourth exemplary embodiment.

FIG. 9 is a block diagram illustrating an example of a functional configuration of an image processing apparatus according to a fifth exemplary embodiment.

FIG. 10 is a flowchart illustrating an example of processing according to the fifth exemplary embodiment.

DESCRIPTION OF THE EMBODIMENTS

Hereinafter, an exemplary embodiment of the disclosure will be described with reference to the appended drawings.

An image processing apparatus 100 according to the present exemplary embodiment is an apparatus which generates a subtraction image between a first image and a second image that are target for the processing. In the below-described exemplary embodiment, the first image and the second image may be called as processing target images. First, the image processing apparatus 100 acquires deformation information of the first image and the second image. Then, the image processing apparatus 100 generates a subtraction image between the first image and the second image based on the acquired deformation information. For generation processing for a subtraction image, the image processing apparatus 100 includes two different generation units, i.e., a first generation unit and a second generation unit, which are different from each other in image resolution in subtraction processing. Based on predetermined information, the image processing apparatus 100 switches a generation unit between the first generation unit and the second generation unit to generate an appropriate subtraction image.

In one embodiment, the generated subtraction image has sharpness equivalent to the sharpness of the first and the second images. Therefore, when a subtraction image of a target having a low noise level (e.g., a bone region in a computed tomography (CT) image of a human body) is to be generated, subtraction processing for generating a subtraction image having the sharpness equivalent to that of the first and the second images is executed. Meanwhile, when a subtraction image of a target having a high noise level (e.g., a parenchyma organ in a CT image of a human body) is to be generated, the generated subtraction image also has a high noise level. Thus, subtraction processing for reducing a noise level of the subtraction image is executed.

The image processing apparatus 100 can reduce a noise level of the subtraction image without lowering the sharpness more than necessary by switching the generation unit for generating the subtraction image based on a characteristic of a processing target image or a region regarded as an observation target which a doctor pays attention to. Hereinafter, a configuration and processing according to the present exemplary embodiment will be described with reference to FIGS. 1 and 2.

Figure 1:
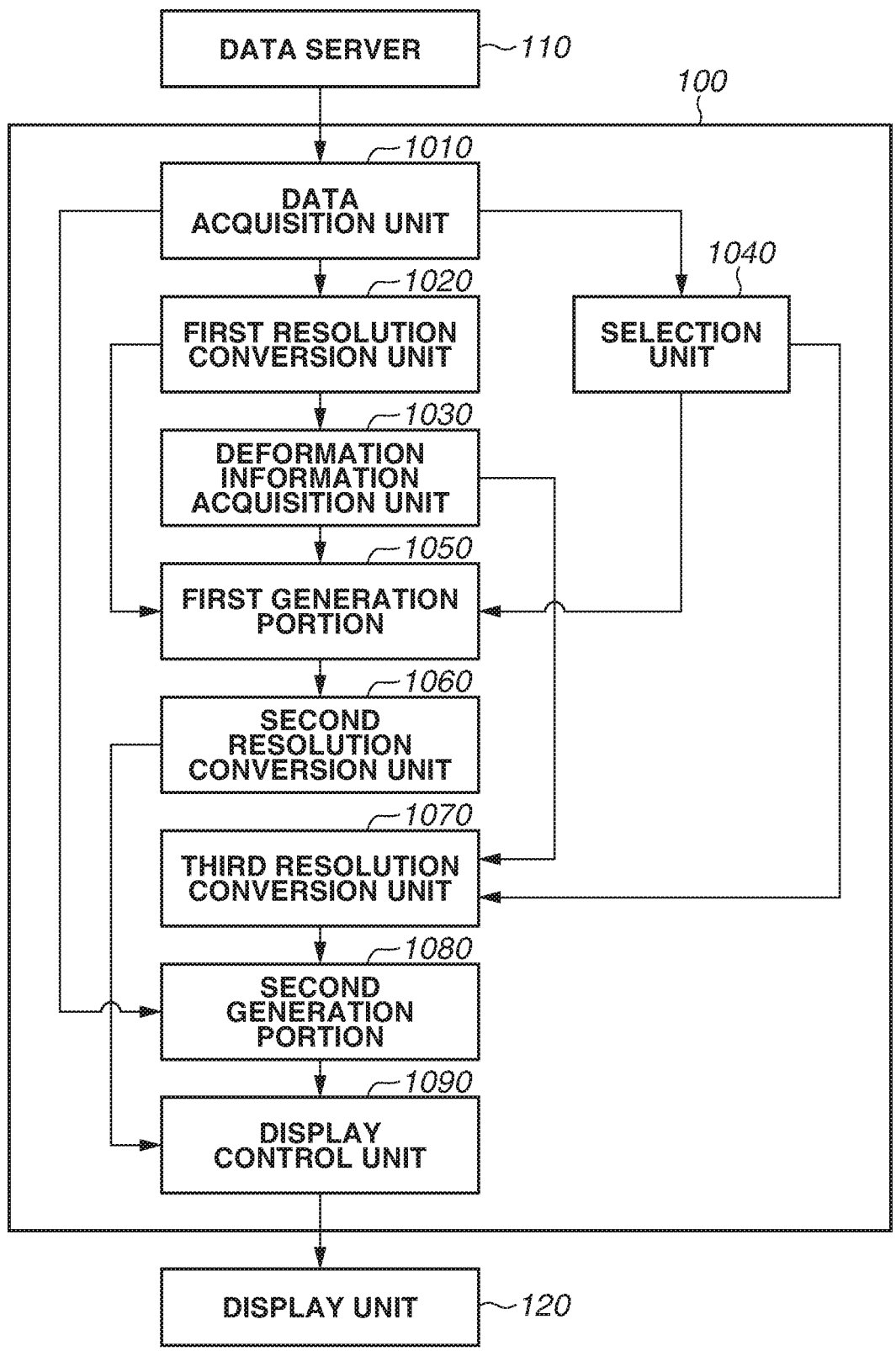
FIG. 1 is a block diagram illustrating an example of a functional configuration of an image processing apparatus according to a first exemplary embodiment.

FIG. 1 is a block diagram illustrating an example of a functional configuration of the image processing apparatus 100. The image processing apparatus 100 is connected to a data server 110 and a display unit 120.

The data server 110 stores a first image and a second image and accompanying information on the respective images. The first image and the second image are specified by a user as the targets of subtraction image generation processing. The data server is, for example, a picture archiving and communication system (PACS). The first and the second images are, for example, three-dimensional tomographic images (volume data) acquired beforehand by capturing a subject image under different conditions, such as date/time, radiographic contrasting conditions, and imaging parameters, using the same modality. A modality for capturing a three-dimensional tomographic image may be a magnetic resonance imaging (MRI) apparatus, an X-ray CT apparatus, a three-dimensional ultrasonic imaging apparatus, a photoacoustic tomographic apparatus, a positron emission computerized-tomographic/single photon emission computerized-tomographic (PET/SPECT) apparatus, or an optical coherence tomographic (OCT) apparatus.

The first and the second images may be the same patient's images captured in the same posture at different date/time using the same modality for the purpose of a follow-up, or may be the same patient's images captured under different radiographic contrasting conditions or different imaging parameters. Further, the first and the second images may be images acquired by capturing different patients' images, or may be a set of images including an image of a patient and a standard image. The standard image, for example, refers to an image generated from average information, such as a pixel value or regional information, acquired from images of various patients.

Further, the accompanying information on the first and the second images includes information about examination regions in the first and the second images, reconfiguration conditions (e.g., in-plane resolution, a slice thickness, and a reconfiguration function), or imaging conditions (e.g., tube voltage, tube current, and radiographic contrasting conditions). The first and the second images and respective pieces of accompanying information are input to the image processing apparatus 100 via a data acquisition unit 1010. The first and the second images may be images compliant with the international standard called Digital Imaging and Communications in Medicine (DICOM), and the accompanying information on the first and the second images may be the information defined by a DICOM tag.

The display unit 120 is a monitor that displays an image generated by the image processing apparatus 100.

The image processing apparatus 100 includes a data acquisition unit 1010, a first resolution conversion unit 1020, a deformation information acquisition unit 1030, a selection unit 1040, a first generation portion 1050, a second resolution conversion unit 1060, a third resolution conversion unit 1070, a second generation portion 1080, and a display control unit 1090.

The data acquisition unit 1010 acquires the first and the second images and respective pieces of accompanying information input to the image processing apparatus 100. Further, the data acquisition unit 1010 acquires a user instruction about a target region as necessary.

The first resolution conversion unit 1020 converts resolution of the first image and the second image to generate a first converted image and a second converted image each with first resolution.

The deformation information acquisition unit 1030 acquires first deformation information between the first converted image and the second converted image with the first resolution.

The selection unit 1040 selects by which generation unit from among the first generation unit and the second generation unit a subtraction image is to be generated.

Based on the first deformation information, the first generation portion 1050 calculates a difference value between corresponding positions in the first converted image and the second converted image, and generates a subtraction image with the first resolution.

The second resolution conversion unit 1060 converts resolution of the subtraction image generated by the first generation portion 1050, i.e., first resolution, into second resolution to generate a first subtraction image. A first generation unit includes the first generation portion 1050 and the second resolution conversion unit 1060.

The third resolution conversion unit 1070 converts resolution in the first deformation information into second resolution to generate second deformation information. Based on the second deformation information, the second generation portion 1080 calculates a difference value between corresponding positions in the first image and the second image, and generates a second subtraction image with the second resolution. A second generation unit includes the third resolution conversion unit 1070 and the second generation portion 1080.

The display control unit 1090 performs display control for causing the display unit 120 to arrange and display the first and the second images and a subtraction image generated by the first generation unit or the second generation unit.

For example, the image processing apparatus 100 is a computer having at least processors (not illustrated) and memories (not illustrated). Each of the processors (not illustrated) is at least any one of a central processing unit (CPU), a graphics processing unit (GPU), an application specific integrated circuit (ASIC), a simple programmable logic device (SPLD), a complex programmable logic device (CPLD), and a field-programmable gate array (FPGA). Each of the memories (not illustrated) is at least any one of a random access memory (RAM), a hard disk, a flash memory, or a solid state drive (SSD). The processor reads and executes a program stored in the memory to realize a function as the image processing apparatus 100. The program may be directly embedded in a circuit of the processor instead of being stored in the memory. In this case, the processor reads and executes the program embedded in the circuit to realize the function as the image processing apparatus 100. Each processor may be configured of a single circuit, or may be configured of a combination of a plurality of independent circuits. The image processing apparatus 100 may have one or a plurality of communication circuits for different purposes.

Figure 2:
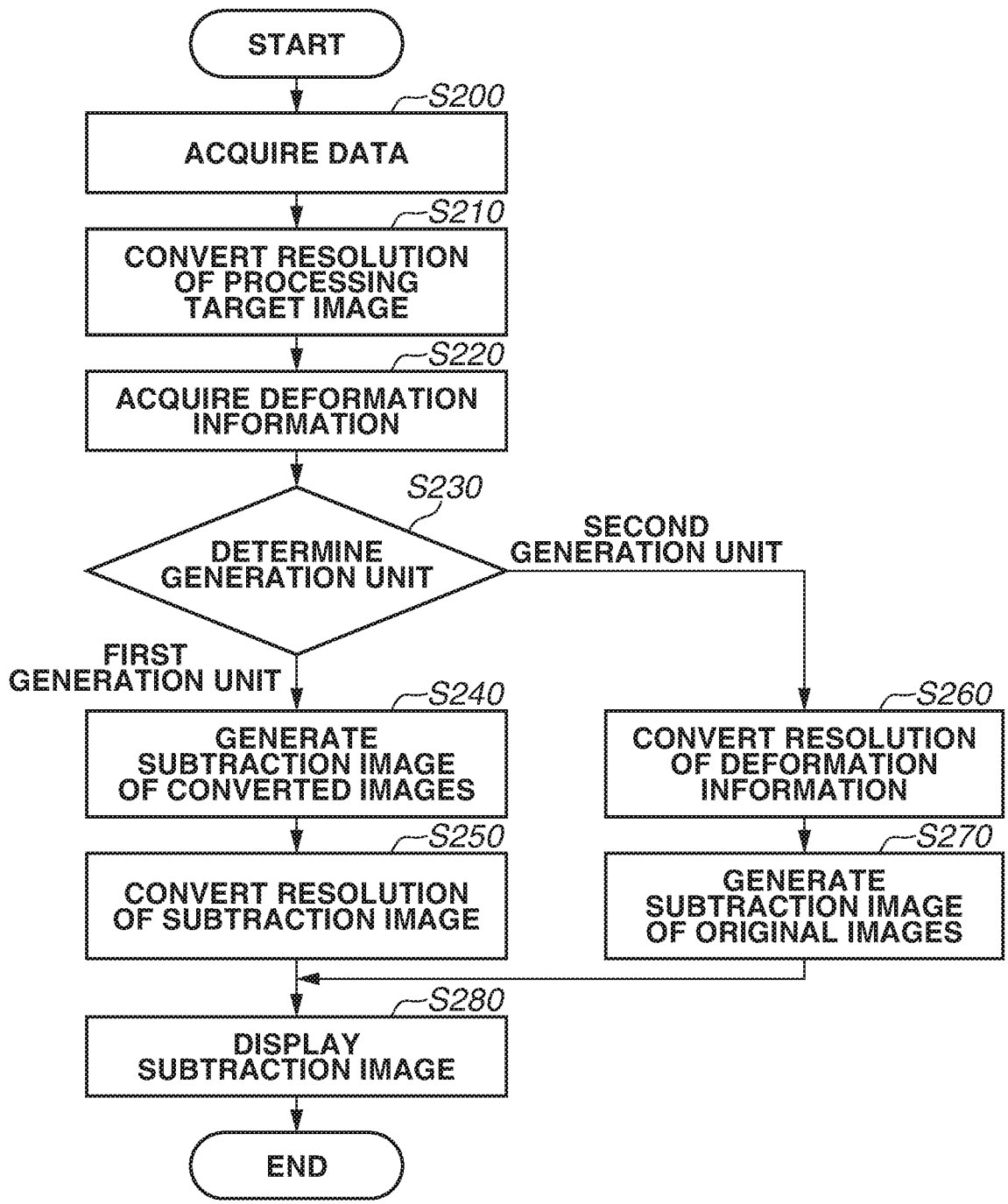
FIG. 2 is a flowchart illustrating an example of processing according to the first exemplary embodiment.

FIG. 2 is a flowchart illustrating an example of the entire processing steps executed by the image processing apparatus 100.

<Step S200: Acquire Data>

In step S200, the data acquisition unit 1010 acquires the first and the second images and accompanying information on the respective images input to the image processing apparatus 100. Further, the data acquisition unit 1010 causes the display unit 120 to display a user interface (UI) (not illustrated) via the display control unit 1090 in order to receive a user instruction about a target region, and acquires information input by the user. The user instruction about a target region refers to an instruction for specifying a region as an observation target that the user pays attention to. The above instruction may be an instruction, for example, "generate a subtraction image focusing on a bone" or "generate a subtraction image focusing on a parenchyma organ". Then, the data acquisition unit 1010 outputs the acquired first and the second images to the first resolution conversion unit 1020 and the second generation portion 1080. The data acquisition unit 1010 further outputs the accompanying information on the acquired first and the second images and information about the user instruction to the selection unit 1040.

<Step S210: Convert Resolution of Processing Target Image>

In step S210, the first resolution conversion unit 1020 converts resolution of the first and the second images to the first resolution to generate the first and the second converted images. The first resolution serves as a reference (i.e., reference resolution) for image registration to be executed in the subsequent processing. For example, if resolution of the original image is not isotropic, isotropic resolution may be used as the first resolution so that the image registration can be executed with high precision. According to the present exemplary embodiment, predetermined resolution (e.g., 1 mm×1 mm×1 mm) is used as the first resolution.

The first resolution is not limited to the predetermined resolution. In a case where the first and the second images are general CT images, in-plane slice resolution becomes high with respect to an interslice distance. Thus, for example, resolution acquired by up-sampling the pixels in the interslice direction according to the in-plane slice resolution may be used as the first resolution. Furthermore, resolution of any one of the images of the first and second images may be used as the first resolution, so that resolution of the first and the second images match each other. Then, the first resolution conversion unit 1020 outputs the generated first and the second converted images to the deformation information acquisition unit 1030 and the first generation portion 1050.

Herein, in a case where the first resolution is lower than the resolution of the first or the second image, acquisition processing of the converted images has an effect of reducing the noise, i.e., an effect similar to that of smoothing processing with respect to the first or the second image.

For example, in a case where resolution conversion processing is not necessary (i.e., in a case where resolution of both of the first and the second images is isotropic, and a difference in resolution of the images is less than a predetermined threshold value), the processing in step S210 is not executed, and the processing in subsequent step is executed by using the original image as the converted image.

Further, according to the present exemplary embodiment, a known image processing method can be used for pixel value interpolation which is executed at the time of resolution conversion. For example, a method such as nearest neighbor interpolation, linear interpolation, or cubic interpolation can be used.

<Step S220: Acquire Deformation Information>

In step S220, the deformation information acquisition unit 1030 acquires the first deformation information with the first resolution. The first deformation information describes a correspondence relationship between pixels which represent a same region in the first and the second converted images (i.e., corresponding pixels in the images). In other words, the deformation information acquisition unit 1030 executes image registration processing (deformation estimation processing) between the first and the second converted images. Then, the deformation information acquisition unit 1030 outputs the acquired first deformation information to the first generation portion 1050 and the third resolution conversion unit 1070.

Herein, deformation information refers to information which applies corresponding coordinates of the second converted image to respective pixels in the first converted image. The deformation information is, for example, volume data having an image size and resolution the same as those of the first converted image. Therefore, the deformation information can be defined as volume data in which a coordinate corresponding to each of the pixels in the first converted image retains a three-dimensional displacement vector value that represents a corresponding coordinate on the second converted image.

For example, according to the present exemplary embodiment, the deformation information acquisition unit 1030 acquires the first deformation information by deforming one of the images in such a manner that the image similarity between the images after deformation increases. A generally-used known method, such as a sum of squared difference (SSD), mutual information, or a cross-correlation coefficient, may be used for the image similarity. Further, a known deformation model, e.g., a deformation model based on the radial basis function such as thin plate spline (TPS), free form deformation (FFD), or large deformation diffeomorphic metric mapping (LDDMM), can be used as a deformation model of the image.

If there are only differences in positions and postures in the first and the second images, or if the differences can be approximated to that extent, the deformation information acquisition unit 1030 can execute rigid body registration between the images to acquire conversion parameters of the position and the posture as the first deformation information. Further, an affine transformation parameters of the images may be acquired as the first deformation information. In addition, any method may be used for acquiring the deformation information. For example, if the target region has been already known based on the accompanying information on the processing target image or by the user instruction, a method dedicated to image registration for that region may be used.

<Step S230: Determine Generation Unit>

In step S230, the selection unit 1040 selects a generation unit for generating a subtraction image. Specifically, based on the accompanying information of the processing target image or a user instruction acquired in step S200, the selection unit 1040 determines by which generation unit from among the first generation unit and the second generation unit the subtraction image is to be generated. In a case where the selection unit 1040 determines that the subtraction image is to be generated by the first generation unit ("FIRST GENERATION UNIT" in step S230), the processing proceeds to step S240. In a case where the selection unit 1040 determines that the subtraction image is to be generated by the second generation unit ("SECOND GENERATION UNIT" in step S230), the processing proceeds to step S260.

For example, the selection unit 1040 can select the generation unit based on the accompanying information about an examination region in the processing target image. For example, a noise level of the parenchyma organ region in the image captured by an X-ray CT apparatus tends to be high. Thus, when the examination region acquired from the accompanying information is the parenchyma organ, the selection unit 1040 selects a subtraction image generation unit (first generation unit) which reduces the noise level.

On the other hand, in comparison to the parenchyma organ, the bone region tends to have a low noise level. Therefore, in a case where the examination region acquired from the accompanying information is the bone region, the selection unit 1040 selects a subtraction image generation unit (second generation unit) which maintains the sharpness of the first and the second images instead of the subtraction image generation unit which reduces the noise level.

The selection unit 1040 may determine the generation unit based on the user instruction about the target region acquired in step S200. The user can input an instruction by operating the image processing apparatus 100. For example, if the user pays attention to a region having a low noise level (e.g., if an instruction such as "generate a subtraction image focusing on a bone" is acquired), the selection unit 1040 may select the second generation unit. Further, if the user pays attention to a region having a high noise level (e.g., if an instruction such as "generate a subtraction image focusing on a parenchyma organ" is acquired), the selection unit 1040 may select the first generation unit.

Further, as another example of a selection method of a generation unit using the accompanying information, the selection unit 1040 may determine the generation unit based on the in-plane resolution of the first and the second images, or based on the slice thickness. For example, in a case where any one of in-plane resolution of any one of the processing target images, a slice thickness of any one of the processing target images, or a cubic volume of one pixel acquired therefrom has a value less than a predetermined threshold value, the selection unit 1040 determines that the noise level is high, and selects the first generation unit. Otherwise, the selection unit 1040 selects the second generation unit. In this case, the first resolution may be used as the predetermined threshold value.

Further, as yet another example of a selection method of a generation unit using the accompanying information, the selection unit 1040 may determine the generation unit based on tube voltage or tube current. For example, in a case where the tube voltage or the tube current of any one of the processing target images has a value less than a predetermined threshold value, the selection unit 1040 determines that the noise level is high, and selects the first generation unit. Otherwise, the selection unit 1040 selects the second generation unit.

Further, as yet another example of a method of selecting a generation unit by using accompanying information, the selection unit 1040 may determine a generation unit based on reconfiguration function or radiographic contrasting conditions. For example, in a case where the reconfiguration function of any one of the processing target images is the mediastinal window, the selection unit 1040 determines that the noise level is low, and selects the second generation unit. Otherwise, the selection unit 1040 selects the first generation unit. At this time, allocation of generation units with respect to the respective reconfiguration functions may be previously defined in a form of a look-up table.

Alternatively, the selection unit 1040 can select a generation unit based on another piece of accompanying information associated with the first and the second generation units by the user. Further, the selection unit 1040 can select a generation unit based on one piece of the accompanying information, or based on a combination of a plurality of pieces of accompanying information.

<Step S240: Generate Subtraction Image of Converted Images>

In step S240, the first generation portion 1050 uses the first deformation information acquired in step S220 to acquire a corresponding position in the second converted image corresponding to a target position in the first converted image. Then, the first generation portion 1050 generates a subtraction image with the first resolution. In the subtraction image, a difference value between each target position in the first converted image and a corresponding position in the second converted image is set as a pixel value. The first generation portion 1050 outputs the acquired subtraction image with the first resolution to the second resolution conversion unit 1060.

In addition, the first generation portion 1050 may generate the subtraction image based on a simple method only calculating a difference value between corresponding pixels or another known method. For example, if the target region has been already known based on the accompanying information of the processing target image or by the user instruction, the first generation portion 1050 can generate a subtraction image in which only the target region is emphasized. Further, the first generation portion 1050 can employ a voxel matching method that is known as a noise reduction method of the subtraction image.

<Step S250: Convert Resolution of Subtraction Image>

In step S250, the second resolution conversion unit 1060 converts resolution of the subtraction image acquired in step S240, i.e., the first resolution, into the second resolution to generate a first subtraction image. Then, the second resolution conversion unit 1060 stores the acquired first subtraction image in the data server 110 and also outputs the first subtraction image to the display control unit 1090.

In this processing, the resolution of the first image can be used as the second resolution. With this configuration, the resolution of the subtraction image and the resolution of the first image match each other. Alternatively, the resolution of the second image may be used as the second resolution, or resolution different from the resolution of the first or the second image may be used as the second resolution.

In this processing, in a case where the first resolution is higher than the second resolution, resolution conversion processing of the subtraction image executed in step S250 has an effect of reducing the noise, i.e., an effect similar to that of smoothing processing with respect to the subtraction image.

In addition, in a case where the resolution conversion processing of the subtraction image is not necessary, the processing in step S250 is not executed, and the subsequent processing will be executed by using the subtraction image acquired in step S240 as the first subtraction image. For example, if the first resolution and the second resolution are equal to each other, the processing in step S250 may be skipped. Further, the processing in step S250 may also be skipped when resolution of the subtraction image is not to be matched with that of the first or the second image.

<Step S260: Convert Resolution of Deformation Information>

In step S260, the third resolution conversion unit 1070 converts resolution in the first deformation information acquired in step S220 into the second resolution to generate second deformation information. Then, the third resolution conversion unit 1070 outputs the acquired second deformation information to the second generation portion 1080.

<Step S270: Generate Subtraction Image of Original Images>

In step S270, the second generation portion 1080 uses the second deformation information generated in step S260 to acquire a corresponding position in the second image corresponding to the target position in the first image. Then, the second generation portion 1080 generates a second subtraction image with the second resolution. In the second subtraction image, a difference value between each target position in the first image and a corresponding position in the second image is set as a pixel value. Then, the second generation portion 1080 stores the acquired second subtraction image in the data server 110, and outputs the second subtraction image to the display control unit 1090. Alternatively, similar to the case of step S240, any method can be used for generating the subtraction image.

<Step S280: Display Subtraction Image>

In step S280, the display control unit 1090 controls displaying of the first subtraction image generated in step S250 or the second subtraction image generated in step S270 on the display unit 120. In this processing, any method can be used for displaying the subtraction image, and the processing in step S280 may be not essential.

As described above, the processing is executed by the image processing apparatus 100.

According to the present exemplary embodiment, the first generation unit is selected when a subtraction image of a target having a high noise level is generated. In a case where the first resolution is lower than the second resolution, an effect similar to that of smoothing processing with respect to the first and the second images can be acquired by the resolution conversion processing in step S210. On the other hand, in a case where the first resolution is higher than the second resolution, an effect similar to that of smoothing processing with respect to the first subtraction image can be acquired by the resolution conversion processing in step S250. In any of the above cases, a noise level of the generated subtraction image can be reduced.

On the other hand, the second generation unit is selected when a subtraction image of a target having a low noise level is generated. In this processing, by the generation processing of a subtraction image of original images executed in step S270, a subtraction image having the sharpness equivalent to that of the first and the second images may be generated because subtraction processing between the first and the second images is executed. In other words, the subtraction image generation unit can be switched as appropriate according to the characteristics of the first and the second images. As a result, a noise level of the subtraction image can be reduced as appropriate according to the characteristics of the image.

Instead of generating and storing the first and the second converted images or the second deformation information in a form of volume data, the first and the second converted images or the second deformation information may be calculated on demand when a value of a certain coordinate is used for the processing step in a following stage. For example, when a corresponding position in the second image corresponding to a target position in the first image is to be acquired by the processing in step S270, the second deformation information may be acquired by interpolating a displacement vector of the target position from the first deformation information. In this case, processing for generating the second deformation information as volume data can be omitted.

<Variation Example 1 of First Exemplary Embodiment: Without Image Registration Processing>

According to the above-described exemplary embodiment, the first deformation information has been acquired by the acquisition processing of the deformation information in step S220. However, if image registration between the first and the second images is not to be executed, for example, when anatomical positions in the first and the second images substantially match each other, processing steps are not limited to the above. In other words, the acquisition processing of the deformation information in step S220 and the resolution conversion processing of the deformation information in step S260 may be skipped. In this case, in the generation processing of the subtraction image of the converted images in step S240, the first generation portion 1050 generates a subtraction image in which a difference value between identical positions in the first and the second converted images is set as a pixel value. Further, in the generation processing of the subtraction image of the original images in step S270, the second generation portion 1080 generates a subtraction image in which a difference value between identical positions in the first and the second images is set as a pixel value.

<Variation Example 2 of First Exemplary Embodiment>

In the above-described exemplary embodiment, the first generation unit converts resolution of the subtraction image into resolution of the first image after executing generation processing of the subtraction image with reference resolution in image registration, and the second generation unit executes generation processing of the subtraction image with the resolution of the first image after converting the resolution in the deformation information into the resolution of the first image. However, the resolution for subtraction image generation processing can be changed according to the characteristics of the processing target image.

For example, the reference resolution in the image registration processing can be changed according to the characteristics of the processing target image. For example, the reference resolution may be set to be normal resolution (e.g., 1 cubic millimeter) when a noise level of the processing target image is determined to be lower than a reference level, and may be set to be greater than normal resolution (e.g., 2 cubic millimeter) when the noise level thereof is determined to be higher than a reference level. Then, the processing of generating a converted image with the normal reference resolution, acquiring deformation information with the normal reference resolution, generating a subtraction image with the normal reference resolution, and converting the resolution of the subtraction image into the second resolution, may be executed by the first generation portion 1050, whereas the same processing using the reference resolution greater than the normal reference resolution may be executed by the second generation portion 1080. With this configuration, reduction of the noise level in the subtraction image can be executed as appropriate according to the characteristics of the image.

An image processing apparatus 300 according to a second exemplary embodiment receives a user instruction to determine by which generation unit from among the first and the second generation units the subtraction image is to be generated. Hereinafter, a configuration and processing of the present exemplary embodiment will be described with reference to FIGS. 3 and 4.

Figure 3:
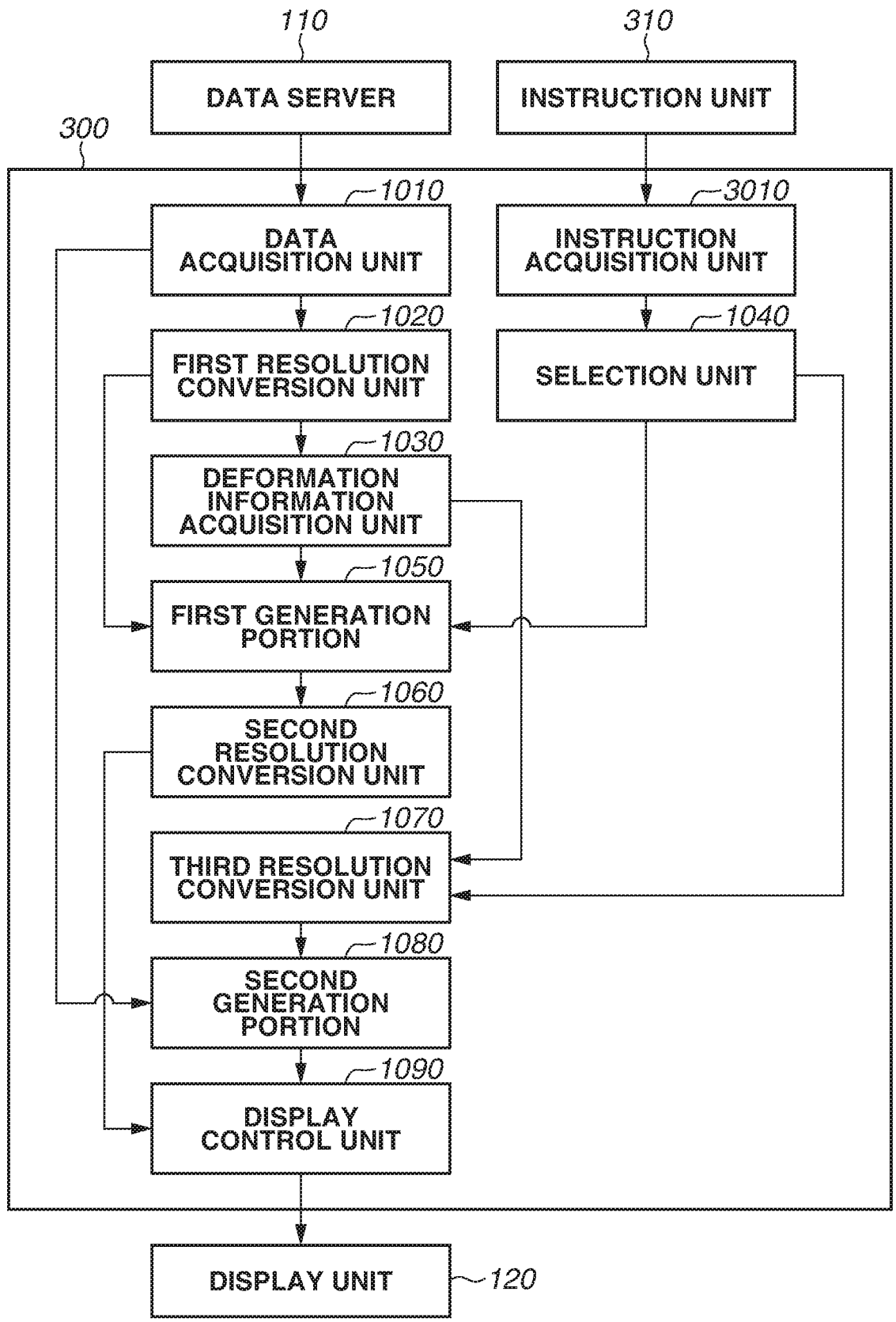
FIG. 3 is a block diagram illustrating an example of a functional configuration of an image processing apparatus according to a second exemplary embodiment.

FIG. 3 is a block diagram illustrating an example of a functional configuration of the image processing apparatus 300. A data server 110 and a display unit 120 are similar to those described in the first exemplary embodiment. An instruction unit 310 receives an instruction from the user about by which generation unit from among the first and the second generation units the subtraction image is to be generated. The instruction received from the user is input to the image processing apparatus 300 via an instruction acquisition unit 3010.

Only a configuration of the image processing apparatus 300 different from the configuration of the image processing apparatus 100 in the first exemplary embodiment will be described. A data acquisition unit 1010 acquires the first and the second images input to the image processing apparatus 300 from the data server 110. The instruction acquisition unit 3010 acquires the user instruction input to the image processing apparatus 300 from the instruction unit 310. Based on the instruction from the user, the selection unit 1040 determines by which generation unit from among the first and the second generation units the subtraction image is to be generated.

Figure 4:
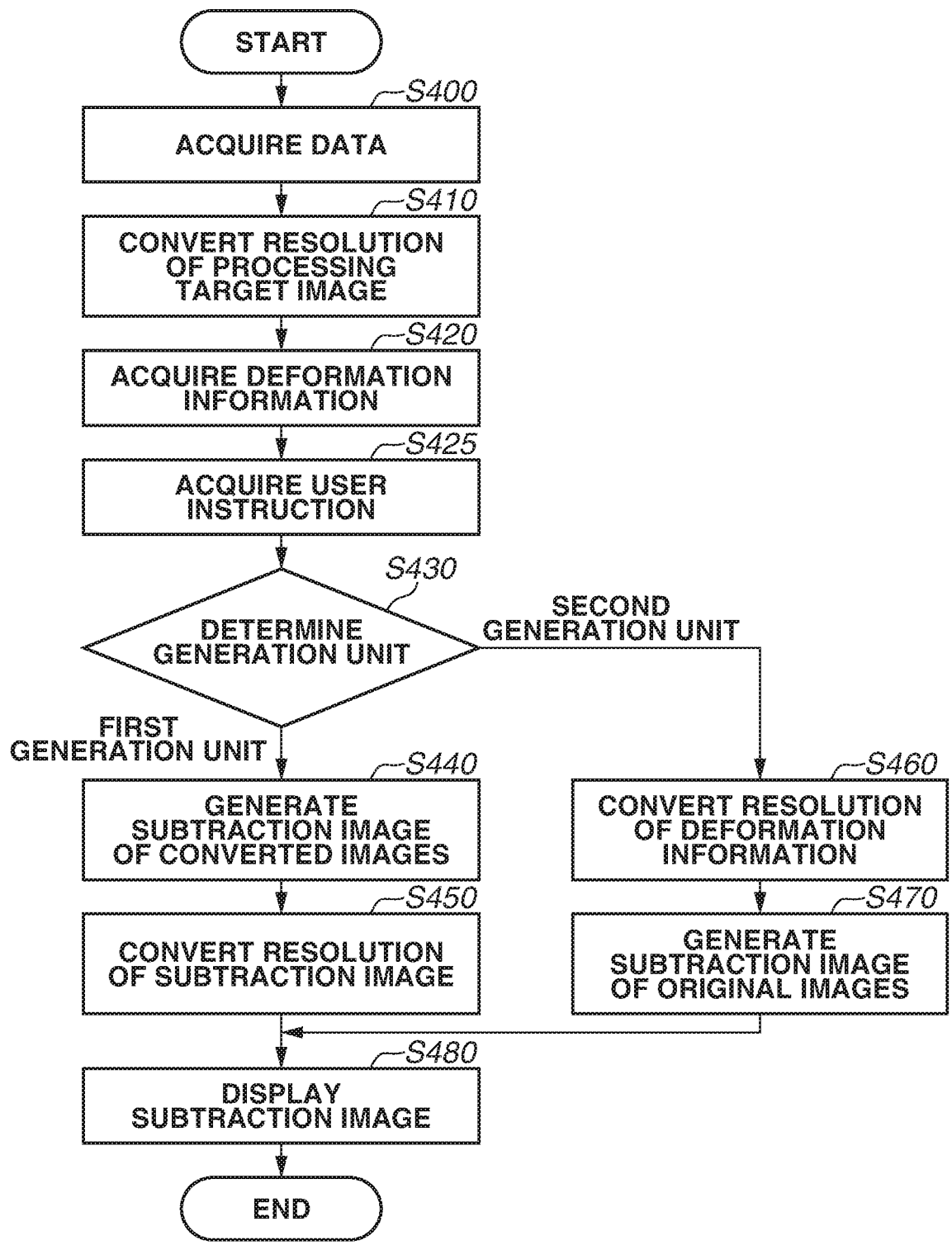
FIG. 4 is a flowchart illustrating an example of processing according to the second exemplary embodiment.

FIG. 4 is a flowchart illustrating an example of the entire processing procedure executed by the image processing apparatus 300. The processing in steps S410, S420, and S440 to S480, is similar to the processing in steps S210, S220, and S240 to S280 in the first exemplary embodiment, respectively. Thus, description already provided earlier is referred, and detailed descriptions thereof will be omitted. Hereinafter, only the processing different from the processing in the flowchart of FIG. 2 will be described.

<Step S400: Acquire Data>

In step S400, the data acquisition unit 1010 acquires the first and the second images input to the image processing apparatus 300. Then, the data acquisition unit 1010 outputs the acquired first and the second images to the first resolution conversion unit 1020 and the second generation portion 1080.

<Step S425: Acquire User Instruction>

In step S425, the instruction acquisition unit 3010 acquires a user instruction input to the image processing apparatus 300 through the instruction unit 310. Specifically, the instruction acquisition unit 3010 acquires an instruction such as "generate a subtraction image by the first generation unit" or "generate a subtraction image by the second generation unit". Then, the instruction acquisition unit 3010 outputs the information about the acquired user instruction to the selection unit 1040.

<Step S430: Determine Generation Unit>

In step S430, according to the information about the user instruction acquired in step S425, the selection unit 1040 determines whether the subtraction image is to be generated by the first generation unit. In other words, in a case where an instruction such as "generate a subtraction image by the first generation unit" is received ("FIRST GENERATION UNIT" in step S430), the processing proceeds to step S440. On the other hand, in a case where an instruction such as "generate a subtraction image by the second generation unit" is received ("SECOND GENERATION UNIT" in step S430), the processing proceeds to step S460.

As described above, the processing is executed by the image processing apparatus 300.

Using the image processing apparatus 300 according to the second exemplary embodiment, the user can switch the subtraction image generation unit according to the characteristics of the first and the second images. As a result, a noise level of the subtraction image can be reduced as appropriate according to the characteristics of the image.

An image processing apparatus 500 according to a third exemplary embodiment switches the first and the second generation units based on a statistic value of a processing target image. Hereinafter, a configuration and processing according to the present exemplary embodiment will be described with reference to FIGS. 5 and 6.

Figure 5:
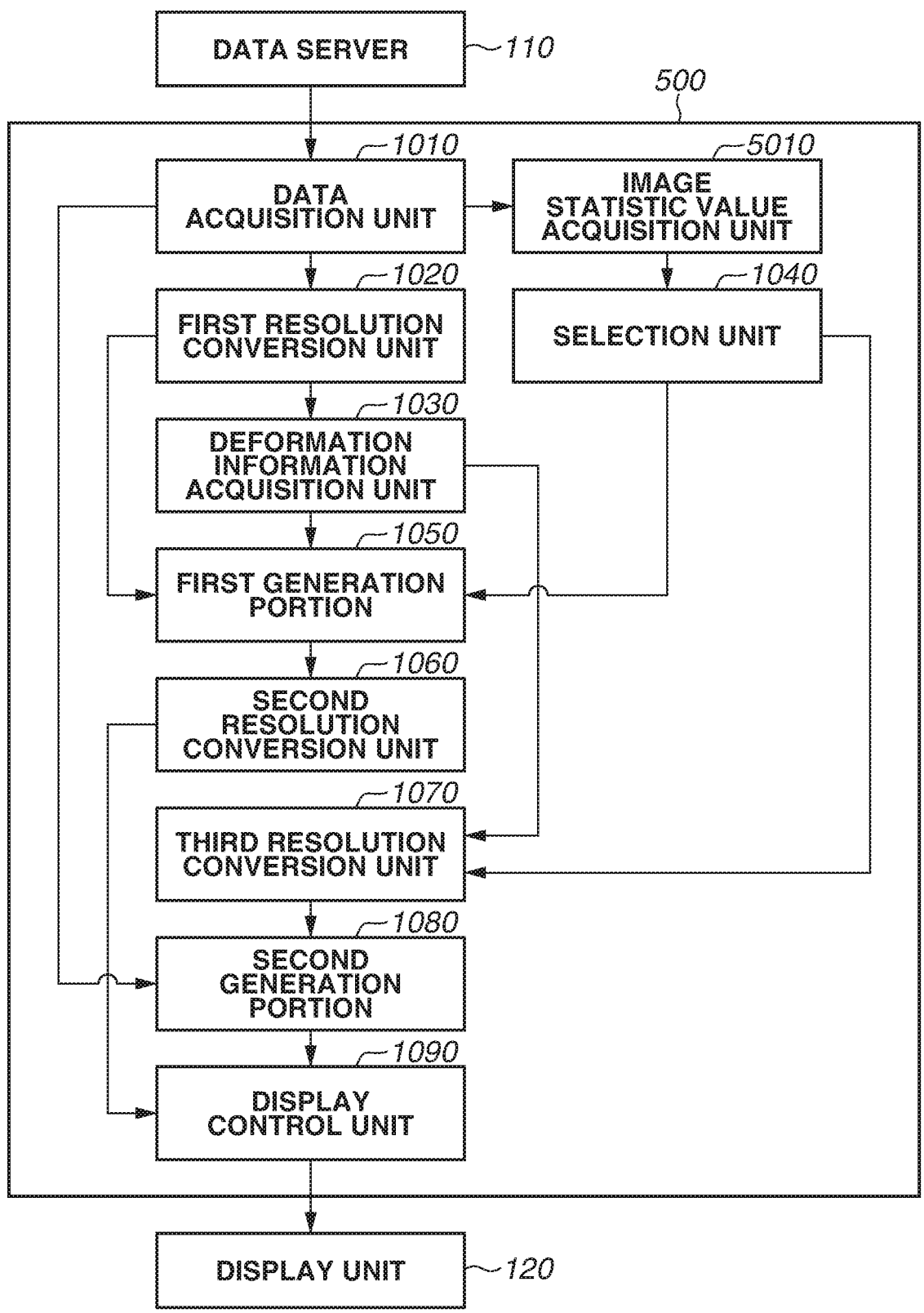
FIG. 5 is a block diagram illustrating an example of a functional configuration of an image processing apparatus according to a third exemplary embodiment.

FIG. 5 is a block diagram illustrating an example of a functional configuration of the image processing apparatus 500. A data server 110 and a display unit 120 are similar to those described in the first exemplary embodiment.

Only a configuration of the image processing apparatus 500 different from the configuration of the image processing apparatus 100 according to the first exemplary embodiment will be described. A data acquisition unit 1010 acquires the first and the second images input to the image processing apparatus 500 from the data server 110. An image statistic value acquisition unit 5010 acquires a statistic value (image statistic value) of at least any one of the first and the second images. Based on the image statistic value acquired by the image statistic value acquisition unit 5010, the selection unit 1040 determines by which generation unit from among the first and the second generation units the subtraction image is to be generated.

Figure 6:
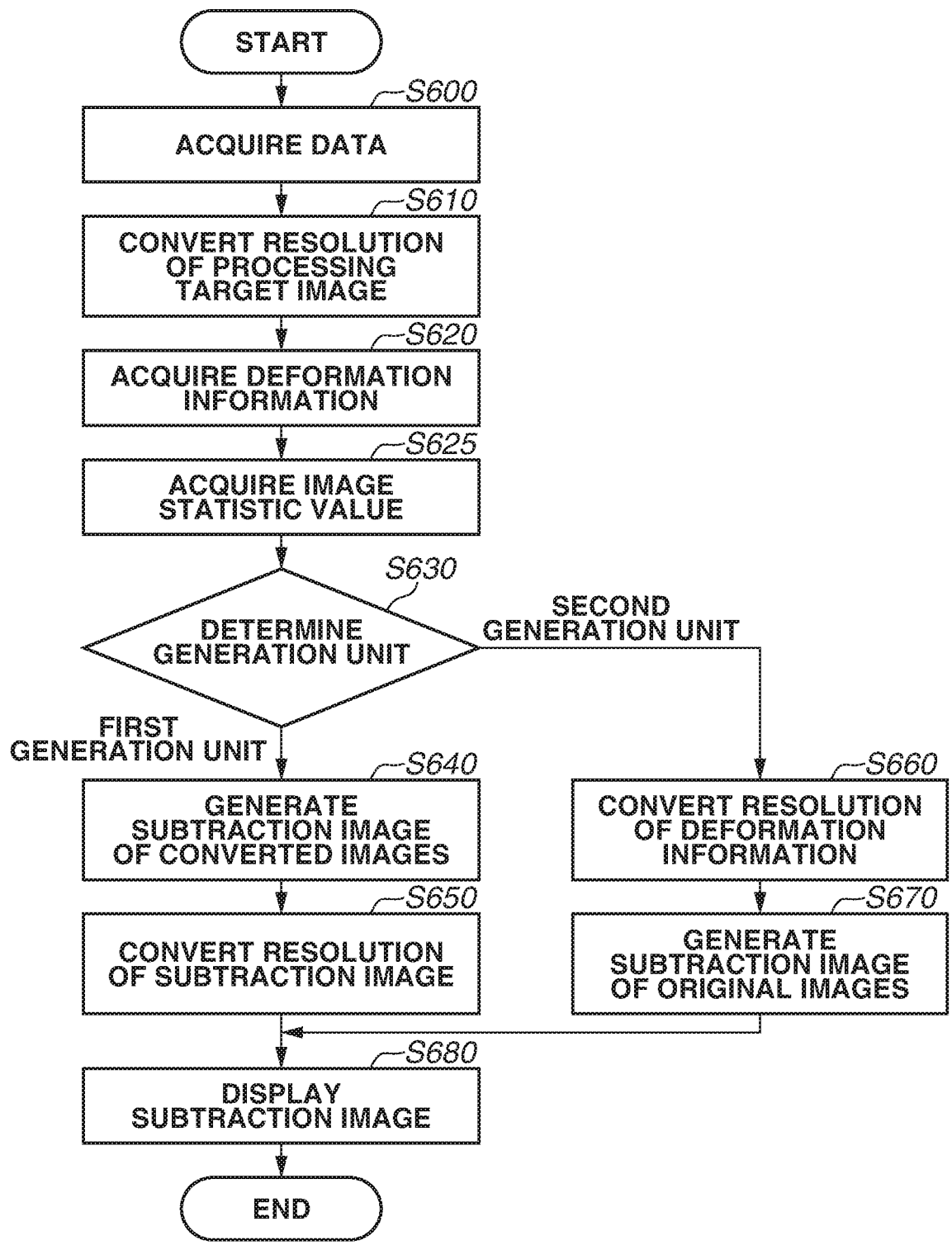
FIG. 6 is a flowchart illustrating an example of processing according to the third exemplary embodiment.

FIG. 6 is a flowchart illustrating an example of the entire processing steps executed by the image processing apparatus 500. The processing in steps S610, S620, and S640 to S680, is similar to the processing in steps S210, S220, and S240 to S280 according to the first exemplary embodiment, respectively. Thus, description already provided earlier is referred, and detailed descriptions thereof will be omitted. Hereinafter, only the processing different from the processing in the flowchart of FIG. 2 will be described.

<Step S600: Acquire Data>

In step S600, the data acquisition unit 1010 acquires the first and the second images input to the image processing apparatus 500. Then, the data acquisition unit 1010 outputs the acquired first and the second images to the first resolution conversion unit 1020, the second generation portion 1080, and the image statistic value acquisition unit 5010.

<Step S625: Acquire Image Statistic Value>

In step S625, the image statistic value acquisition unit 5010 executes statistic processing on at least any one of the first and the second images acquired in step S600, and acquires a statistic value (image statistic value) of the image. Then, the image statistic value acquisition unit 5010 outputs the acquired statistic value to the selection unit 1040.

According to the present exemplary embodiment, for example, the statistic value refers to a variance value of the image. The statistic value may be a variance value of the pixel values of the entire image, or may be a variance value of the pixel values of the pixels randomly sampled from the image. Alternatively, a target region (e.g., parenchyma organ region) may be set thereto, and a variance value of pixel values within the target region may be taken as the static value. Further, an average value or a median value may be taken as a static value instead of a variance value. Furthermore, the image statistic value acquisition unit 5010 may acquire one statistic value, or may acquire a plurality of statistic values. Further, the image statistic value acquisition unit 5010 may directly output the statistic values of respective images, or may select a representative value (e.g., a value greater than another value) and output the selected value. Further, the image statistic value acquisition unit 5010 may acquire a statistic value applicable to both of the first and the second images (e.g., an entire average or variance), or may use an average of the statistic values of the respective images.

<Step S630: Determine Generation Unit>

In step S630, based on the statistic value of the image acquired in step S625, the selection unit 1040 determines whether the subtraction image is to be generated by the first generation unit. Then, in a case where the selection unit 1040 determines that the subtraction image is to be generated by the first generation unit ("FIRST GENERATION UNIT" in step S630), the processing proceeds to step S640. On the other hand, in a case where the selection unit 1040 determines that the subtraction image is to be generated by the second generation unit ("SECOND GENERATION UNIT" in step S630), the processing proceeds to step S660.

For example, processing using a variance value as the statistic value is considered. A noise level tends to be high in the image having a high variance value. Thus, in a case where the variance value of at least any one of the first and the second images exceeds a predetermined threshold value, the selection unit 1040 selects a subtraction image generation unit (i.e., first generation unit) which reduces the noise level. With respect to the image having a low variance value, the selection unit 1040 selects a subtraction image generation unit (i.e., second generation unit) which maintains the sharpness. In this respect, the image statistic value may be serves as an index of the noise level in the processing target image.

According to the present exemplary embodiment, although processing of determining a generation unit based on a variance value served as a statistic value has been described, a statistic value other than the variance value may be used. For example, an average value or a median value may be used. Alternatively, a combination of a plurality of statistic values may be used.

As described above, the processing is executed by the image processing apparatus 500.

Using the image processing apparatus 500 according to the third exemplary embodiment, the subtraction image generation unit can be switched as appropriate according to the characteristics of the first and the second images. This leads reduction in a noise level in the subtraction image as appropriate according to the characteristics of the image.

An image processing apparatus 700 according to a fourth exemplary embodiment generates two types of subtraction images using respective generation units without switching the first and the second generation units, and displays the generated subtraction images. With this configuration, the user can compare and switch the two types of subtraction images. In other words, the user can directly select a subtraction image having a low noise level or a subtraction image having high sharpness. Hereinafter, a configuration and processing according to the present exemplary embodiment will be described with reference to FIGS. 7 and 8.

Figure 7:
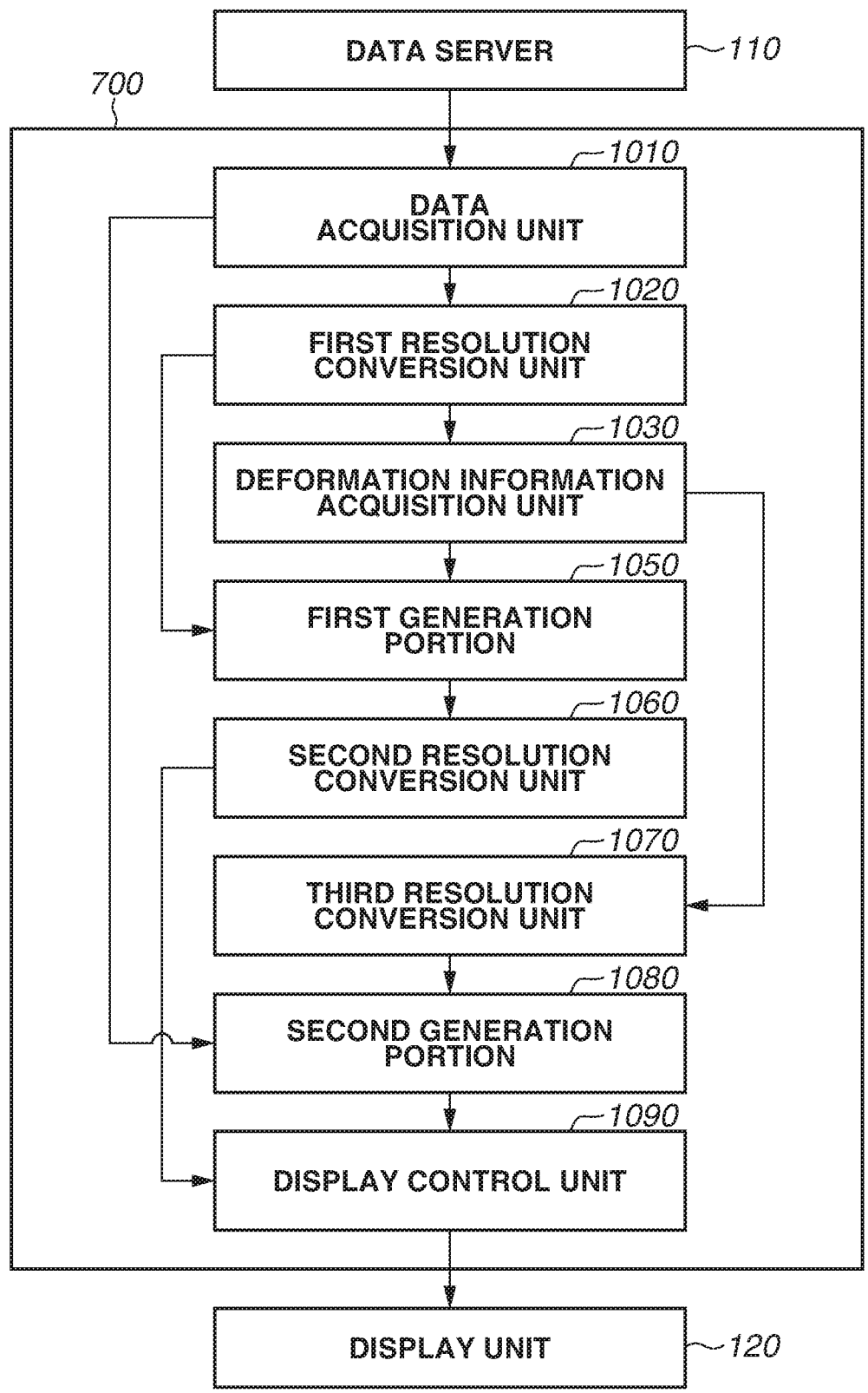
FIG. 7 is a block diagram illustrating an example of a functional configuration of an image processing apparatus according to a fourth exemplary embodiment.

FIG. 7 is a block diagram illustrating an example of a functional configuration of the image processing apparatus 700. A data server 110 and a display unit 120 are similar to those described in the first exemplary embodiment.

Only a configuration of the image processing apparatus 700 different from the configuration of the image processing apparatus 100 according to the first exemplary embodiment will be described. A data acquisition unit 1010 acquires the first and the second images input to the image processing apparatus 700. The display control unit 1090 executes display control for arranging and displaying the first and the second images and the subtraction images generated by the first and the second generation units on the display unit 120. Further, the image processing apparatus 700 is different from the image processing apparatus 100 according to the first exemplary embodiment in that the image processing apparatus 700 does not have the selection unit 1040.

FIG. 8 is a flowchart illustrating an example of the entire processing procedure executed by the image processing apparatus 700. The processing in steps S810, S820, and S840 to S870 is similar to the processing in steps S210, S220, and S240 to S270 according to the first exemplary embodiment, respectively. Descriptions thereof thus will be omitted. Hereinafter, only the processing different from the processing in the flowchart of FIG. 2 will be described.

<Step S800: Acquire Data>

In step S800, the data acquisition unit 1010 acquires the first and the second images input to the image processing apparatus 700. Then, the data acquisition unit 1010 outputs the acquired first and the second images to the first resolution conversion unit 1020 and the second generation portion 1080.

In the present exemplary embodiment, processing for selecting the generation unit which corresponds to the processing in step S230 in the first exemplary embodiment is not executed. More specifically, the processing in steps S840 to S850 executed by the first generation unit and the processing in steps S860 to S870 executed by the second generation unit are executed sequentially.

<Step S880: Display Subtraction Image>

In step S880, the display control unit 1090 controls displaying of the first subtraction image generated in step S850 and the second subtraction image generated in step S870 on the display unit 120.

To display the subtraction images, any method can be used. For example, the display control unit 1090 may divide one screen longitudinally or transversely to arrange and display the first image, the second image, the first subtraction image, and the second subtraction image. Further, with respect to the subtraction images, the display control unit 1090 may display any one of the first and the second subtraction images based on selection of the user. Further, the display control unit 1090 may superimpose and display the first or the second subtraction image rendered in a color different from a color of the first or the second image. Alternatively, the display control unit 1090 may select and display any one of the first image, the second image, the first subtraction image and the second subtraction image by freely switching the images at the same position. In addition, the processing in step S880 does not always have to be executed.

As described above, the processing is executed by the image processing apparatus 700.

Using the image processing apparatus 700 according to the fourth exemplary embodiment, subtraction images generated by the first and the second generation units can be displayed. In other words, the user can check the two types of subtraction images to select a more suitable subtraction image.

An image processing apparatus 900 according to a fifth exemplary embodiment does not have a function of switching the generation units, but generates a subtraction image by the second generation unit and displays the generated subtraction image. With this configuration, a subtraction image having the sharpness equivalent to the sharpness of the first or the second image can be constantly generated regardless of the image characteristics. Hereinafter, a configuration and processing according to the present exemplary embodiment will be described with reference to FIGS. 9 and 10.

FIG. 9 is a block diagram illustrating an example of a functional configuration of the image processing apparatus 900. A data server 110 and a display unit 120 are similar to those described in the first exemplary embodiment.

Only a configuration of the image processing apparatus 900 different from that of the image processing apparatus 700 in the fourth exemplary embodiment will be described. The image processing apparatus 900 includes units of the image processing apparatus 700 according to the fourth exemplary embodiment excluding the first generation unit (i.e., the first generation portion 1050 and the second resolution conversion unit 1060). The display control unit 1090 controls displaying of the subtraction image generated by the second generation unit on the display unit 120.

FIG. 10 is a flowchart illustrating an example of the entire processing procedure executed by the image processing apparatus 900. The processing in steps S1000, S1060, and S1070 is similar to the processing in steps S800, S860, and S870 according to the fourth exemplary embodiment, respectively. Descriptions thereof will be thus omitted. Hereinafter, only the processing different from the processing in the flowchart of FIG. 2 will be described.

<Step S1010: Convert Resolution of Processing Target Image>

The processing executed by the first resolution conversion unit 1020 in step S1010 is similar to the processing described in the other exemplary embodiments. However, because the image processing apparatus 900 according to the present exemplary embodiment does not include the first generation portion 1050, the acquired first and the second converted images are output to only the deformation information acquisition unit 1030.

<Step S1020: Acquire Deformation Information>

The processing executed by the deformation information acquisition unit 1030 in step S1020 is similar to the processing described in the other exemplary embodiments. However, because the image processing apparatus 900 according to the present exemplary embodiment does not include the first generation portion 1050, the acquired first deformation information is output to only the third resolution conversion unit 1070.

<Step S1080: Display Subtraction Image>

In step S1080, the display control unit 1090 controls displaying of the second subtraction image generated in step S1070 on the display unit 120. In this processing, any known method can be used for displaying the subtraction image, and the processing in step S1080 may be skipped.

As described above, the processing is executed by the image processing apparatus 900.

Through the image processing apparatus 900 according to the fifth exemplary embodiment, a subtraction image generated by the second generation unit can be displayed. In other words, a subtraction image having the sharpness equivalent to the sharpness of the first or the second image can be constantly generated regardless of the image characteristics.

<Variations>

The disclosure can be realized in such a manner that a program for realizing one or more functions according to the above-described exemplary embodiments is supplied to a system or an apparatus via a network or a storage medium, so that one or more processors in the system or the apparatus reads and executes the program. Further, the disclosure can be also realized with a circuit (e.g., application specific integrated circuit (ASIC)) that realizes one or more functions.

The image processing apparatus according to each of the above-described exemplary embodiments may be a single apparatus, or may be an image processing system including a plurality of apparatuses capable of communicating with each other to execute the above-described processing. Both of the cases are included in the scope of the exemplary embodiments of the disclosure. Further, the above-described processing may be executed by a common server apparatus or a server group. The plurality of apparatuses which are included in the image processing apparatus or the image processing system may be such apparatuses that can communicate at a predetermined communication rate, and these apparatuses may be installed not in the same facility or the same country.

The disclosure includes an exemplary embodiment in which a program of software which realizes the functions of the above-described exemplary embodiments is supplied to a system or an apparatus, and a computer of the system or the apparatus reads and executes the program code supplied thereto.

Accordingly, the program code itself that is installed in the computer in order to realize the processing according to the exemplary embodiments through the computer is also included in the exemplary embodiment of the disclosure. Further, an OS operating on the computer may execute all or a part of actual processing based on an instruction included in the program read by the computer, so that functions of the above-described exemplary embodiments can be realized through that processing.

Furthermore, a configuration in which the above-described exemplary embodiments are combined with each other is also included in the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-251422, filed Dec. 27, 2017, which is hereby incorporated by reference herein in its entirety.

What is claimed is:

1. An apparatus comprising:
a processor; and
a memory coupled to the processor storing computer-executable instructions that, when executed by the processor, cause the processor to perform operations as:
a conversion unit for acquiring a first converted image by converting resolution of a first image of a subject into first resolution and acquiring a second converted image by converting resolution of a second image into the first resolution;
an acquisition unit for acquiring first deformation information with the first resolution, the first deformation information being for executing image registration between the first converted image and the second converted image;
a first generation unit for generating a subtraction image with the first resolution based on the first deformation information, the subtraction image showing a difference between the first converted image and the second converted image;
a second generation unit for generating a second subtraction image based on second deformation information obtained such that resolution in the first deformation information is converted into the resolution of the first image, the second subtraction image showing a difference between the first image and the second image; and
a selection unit for selecting by which generation unit from among the first generation unit and the second generation unit the subtraction image is to be generated,
wherein the selection unit selects either the first generation unit or the second generation unit based on a target region by a user of the subtraction image to be generated.

2. The apparatus according to claim 1, wherein the first generation unit generates the subtraction image by converting resolution of the subtraction image into the resolution of the first image.

3. The apparatus according to claim 1, wherein the target region is acquired from accompanying information that accompanies at least any one of the first image and the second image.

4. The apparatus according to claim 3,
wherein the accompanying information includes information about a region of the subject regarded as a testing target, and
wherein the selection unit selects the first generation unit in a case where the region is a parenchyma organ, and selects the second generation unit in a case where the region is a bone.

5. The apparatus according to claim 1, wherein, based on an operation input by a user, the selection unit selects by which generation unit the subtraction image is to be generated.

6. The apparatus according to claim 1, wherein, based on an image characteristic of the target region at least any one of the first image and the second image, the selection unit selects by which generation unit the subtraction image is to be generated.

7. The apparatus according to claim 6, wherein the image characteristic includes a noise level of an image.

8. The apparatus according to claim 7, wherein the selection unit selects the first generation unit in a case where a noise level of an image is higher than a predetermined level, and selects the second generation unit in a case where a noise level of an image is lower than the predetermined level.

9. The apparatus according to claim 6, wherein the image characteristic includes a statistic value of an image.

10. The apparatus according to claim 9, wherein the statistic value includes at least any one of a variance value, an average value, and a median value.

11. The apparatus according to claim 9, wherein the statistic value is an index of a noise level of an image.

12. The apparatus according to claim 9,
wherein the statistic value is a variance value, and
wherein the selection unit selects the first generation unit in a case where the variance value is greater than a predetermined threshold value, and selects the second generation unit in a case where the variance value is less than the predetermined threshold value.

13. A method comprising:
acquiring a first converted image by converting resolution of a first image of a subject into first resolution and acquiring a second converted image by converting resolution of a second image into the first resolution;
acquiring first deformation information for executing image registration between the first converted image and the second converted image with the first resolution;
generating a first subtraction image based on the first deformation information in a case where the first resolution is selected, the first subtraction image showing a difference between the first converted image and the second converted image;
generating a second subtraction image based on second deformation information obtained such that resolution in the first deformation information is converted into the resolution of the first image, in a case where the resolution of the first image is selected, the second subtraction image showing a difference between the first image and the second image; and
selecting either the first subtraction image or the second subtraction image to be generated based on a target region by a user of a subtraction image to be generated.

14. A non-transitory computer readable storage medium storing a program which causes a computer to execute a method comprising:
acquiring a first converted image by converting resolution of a first image of a subject into first resolution and acquiring a second converted image by converting resolution of a second image into the first resolution;
acquiring first deformation information for executing image registration between the first converted image and the second converted image with the first resolution;
generating a first subtraction image based on the first deformation information in a case where the first resolution is selected, the first subtraction image showing a difference between the first converted image and the second converted image;
generating a second subtraction image based on second deformation information obtained such that resolution in the first deformation information is converted into the resolution of the first image, in a case where the resolution of the first image is selected, the second subtraction image showing a difference between the first image and the second image; and selecting either the first subtraction image or the second subtraction image to be generated based on a target region by a user of a subtraction image to be generated.

* * * * *